US012623190B2

(12) United States Patent
Wang et al.

(10) Patent No.: US 12,623,190 B2
(45) Date of Patent: May 12, 2026

(54) FABRICATION OF AQUAPORIN-BASED BIOMIMETIC MEMBRANE

(71) Applicant: Nanyang Technological University, Singapore (SG)

(72) Inventors: Rong Wang, Singapore (SG); Saren Qi, Singapore (SG); Ye Li, Singapore (SG)

(73) Assignee: Nanyang Technological University, Singapore (SG)

( * ) Notice: Subject to any disclaimer, the term of this patent is extended or adjusted under 35 U.S.C. 154(b) by 898 days.

(21) Appl. No.: 17/421,340

(22) PCT Filed: Jan. 8, 2020

(86) PCT No.: PCT/SG2020/050008
§ 371 (c)(1),
(2) Date: Jul. 7, 2021

(87) PCT Pub. No.: WO2020/145895
PCT Pub. Date: Jul. 16, 2020

(65) Prior Publication Data
US 2022/0088544 A1 Mar. 24, 2022

(30) Foreign Application Priority Data
Jan. 8, 2019 (SG) ........................... 10201900164Y

(51) Int. Cl.
*B01D 69/14* (2006.01)
*B01D 67/00* (2006.01)
(Continued)

(52) U.S. Cl.
CPC ....... *B01D 69/144* (2013.01); *B01D 67/0006* (2013.01); *B01D 69/02* (2013.01);
(Continued)

(58) Field of Classification Search
None
See application file for complete search history.

(56) References Cited

U.S. PATENT DOCUMENTS 3,744,642 A 7/1973 Scala et al.
6,916,488 B1 7/2005 Meier et al.
(Continued)

FOREIGN PATENT DOCUMENTS

CN 104056494 A 9/2014
CN 105727772 A 7/2016
(Continued)

OTHER PUBLICATIONS

MT KR 20120050970 (Year: 2012).*
(Continued)

*Primary Examiner* — Peter Keyworth
(74) *Attorney, Agent, or Firm* — Seed IP Law Group LLP

(57) ABSTRACT

Methods of fabricating a membrane comprising proteoliposomes having protein water channels are provided herein. The method may include providing a porous substrate, depositing a solution containing proteoliposomes on the porous substrate, and then contacting the porous substrate with an aqueous monomer solution and an organic monomer solution to form a selective layer on the porous substrate embedding the proteoliposomes. The method may include depositing the aqueous monomer solution, then the solution containing the proteoliposomes, then the organic monomer solution, to form the selective layer. The present disclosure also describes the membrane and a system operable to accommodate both methods.

13 Claims, 9 Drawing Sheets

(51) Int. Cl.

| | | |
|---|---|---|
| *B01D 69/02* | (2006.01) | |
| *B01D 69/12* | (2006.01) | |
| *B01D 71/56* | (2006.01) | |
| *B01D 71/74* | (2006.01) | |
| *C02F 1/44* | (2023.01) | |
| *C08L 81/06* | (2006.01) | |

(52) U.S. Cl.
CPC ......... *B01D 69/1251* (2022.08); *B01D 71/56* (2013.01); *B01D 71/74* (2013.01); *C02F 1/44* (2013.01); *C08L 81/06* (2013.01); *B01D 2323/26* (2013.01); *B01D 2325/04* (2013.01); *C08L 2205/20* (2013.01)

(56) References Cited

U.S. PATENT DOCUMENTS

| | | | |
|---|---|---|---|
| 9,440,195 | B2 | 9/2016 | Montemagno |
| 2004/0049230 | A1 | 3/2004 | Montemagno et al. |
| 2011/0084026 | A1 | 4/2011 | Freger et al. |
| 2014/0332468 | A1 | 11/2014 | Tang et al. |
| 2015/0144553 | A1 | 5/2015 | Vogel et al. |
| 2015/0217238 | A1* | 8/2015 | Tang ................... B01D 69/1251 210/483 |
| 2017/0100697 | A1* | 4/2017 | Serra Alfaro ........... C01B 13/02 |

FOREIGN PATENT DOCUMENTS

| | | | | | |
|---|---|---|---|---|---|
| CN | 106731908 | A | | 5/2017 | |
| CN | 108043241 | A | | 5/2018 | |
| CN | 108136330 | A | | 6/2018 | |
| CN | 108854575 | A | | 11/2018 | |
| KR | 20120050970 | A | * | 5/2012 | ............. B01D 61/40 |
| WO | 2012/161662 | A1 | | 11/2012 | |
| WO | 2017/030502 | A1 | | 2/2017 | |

OTHER PUBLICATIONS

Office Action, dated May 24, 2024, for Chinese Patent Application No. 202080019824.7. (15 pages) (with English Translation).

Borgnia et al., "Functional Reconstitution and Characterization of AqpZ, the *E. coli* Water Channel Protein," *Journal of Molecular Biology* 291:1169-1179, 1999.

Cohen-Tanugi et al., "Quantifying the potential of ultra-permeable membranes for water desalination," *Energy and Environmental Science* 7:1134-1141, 2014.

Dhumal et al., "Interfacial polycondensation—Modeling of kinetics and film properties," *Journal of Membrane Science* 325:758-771, 2008.

Elimelech et al., "The Future of Seawater Desalination: Energy, Technology, and the Environment," *Science* 333(6043):712-717, Aug. 5, 2011 (7 Pages).

Freger, "Kinetics of Film Formation by Interfacial Polycondensation," *Langmuir* 21(5):1884-1894, 2005.

Greenlee et al., "Reverse osmosis desalination: Water sources, technology, and today's challenges," *Water Research* 43:2317-2348, 2009.

Hansen et al., "Interaction between sodium dodecyl sulfate and membrane reconstituted aquaporins: A comparative study of spinach SoPIP2; 1 and *E. coli* AqpZ," *Biochimica et Biophysica Acta* 1808:2600-2607, 2011.

Karan et al., "Sub-10 nm polyamide nanofilms with ultrafast solvent transport for molecular separation" *Science* 348(6241):1347-1351, Jun. 19 2015 (6 Pages).

Kumar et al., "Highly permeable polymeric membranes based on the incorporation of the functional water channel protein Aquaporin Z," *Proceedings of the National Academy of Sciences* 104(52):20719-20724, Dec. 26 2007.

Lee et al., "Facile Preparation of Polyamide Thin-Film Nanocomposite Membranes Using Spray-Assisted Nanofiller Predeposition," *Industrial & Engineering Chemistry Research* 58:4248-4256, 2019.

Li et al., "Fabrication of a robust high-performance FO membrane by optimizing substrate structure and incorporating aquaporin into selective layer," *Journal of Membrane Science* 525:257-268, 2017.

Li et al., "Fusion behaviour of aquaporin Z incorporated proteoliposomes investigated by quartz crystal microbalance with dissipation (QCM-D)," *Colloids and Surfaces B: Biointerfaces* 111:446-452, 2013.

Li et al., "Nature gives the best solution for desalination: Aquaporin-based hollow fiber composite membrane with superior performance," *Journal of Membrane Science* 494:68-77, 2015.

Li et al., "Preparation of high performance nanofiltration (NF) membranes incorporated with aquaporin Z," *Journal of Membrane Science* 450:181-188, 2014.

Li et al., "Preparation of supported lipid membranes for aquaporin Z incorporation," *Colloids and Surfaces B: Biointerfaces* 94:333-340, 2012.

Matthews et al., "Growth dynamics of interfacially polymerized polyamide layers by diffuse reflectance spectroscopy and Rutherford backscattering spectrometry" *Journal of Membrane Science* 429:71-80, 2013.

Merkel et al., "Ultrapermeable, reverse-selective nanocomposite membranes," *Science* 296(5567):519-522, Apr. 19 2002 (5 Pages).

Murata et al., "Structural determinants of water permeation through aquaporin-1," *Nature* 407:599-605, Oct. 5, 2000.

Petersen, "Composite reverse osmosis and nanofiltration membranes," *Journal of Membrane Science* 83:81-150, 1993.

Preston et al., "Appearance of water channels in Xenopus oocytes expressing red cell CHIP28 protein," *Science* 256:385-387, Apr. 17, 1992.

Qi et al., "Aquaporin-based biomimetic reverse osmosis membranes: Stability and long term performance," *Journal of Membrane Science* 508:94-103,2016.

Saren et al., "Synthesis and characterization of novel forward osmosis membranes based on layer-by-layer assembly," *Environmental Science and Technology* 45:5201-5208, 2011.

Shannon et al., "Science and technology for water purification in the coming decades," *Nature* 452:337-346, Mar. 20 2008.

Tang et al., "Coupled effects of internal concentration polarization and fouling on flux behavior of forward osmosis membranes during humic acid filtration," *Journal of Membrane Science* 354:123-133, 2010.

Tang et al., "Probing the nano- and micro-scales of reverse osmosis membranes—A comprehensive characterization of physiochemical properties of uncoated and coated membranes by XPS, TEM, ATR-FTIR, and streaming potential measurements," *Journal of Membrane Science* 287:146-156, 2007.

Yan et al., "The porous structure of the fully-aromatic polyamide film in reverse osmosis membranes," *Journal of Membrane Science* 475:504-510, 2015.

Zhao et al., "Effects of Proteoliposome Composition and Draw Solution Types on Separation Performance of Aquaporin-Based Proteoliposomes: Implications for Seawater Desalination Using Aquaporin-Based Biomimetic Membranes," *Environmental Science & Technology* 47:1496-1503, 2013.

Zhao et al., "Synthesis of robust and high-performance aquaporin-based biomimetic membranes by interfacial polymerization-membrane preparation and RO performance characterization," *Journal of Membrane Science* 423-424:422-428, 2012.

* cited by examiner

FIG. 2
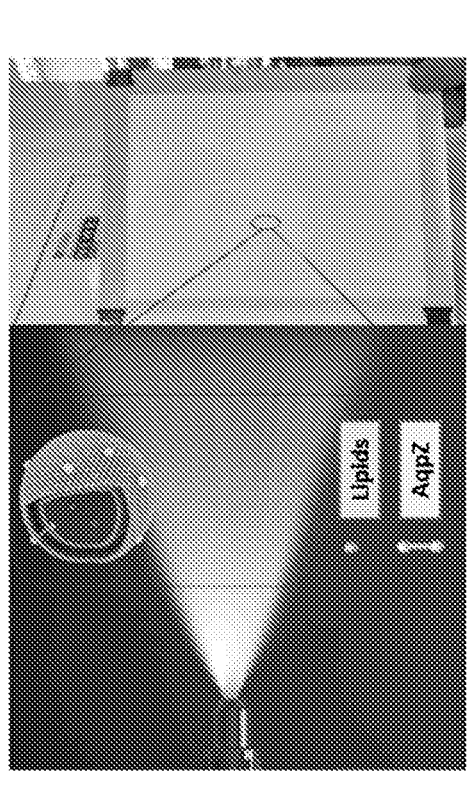
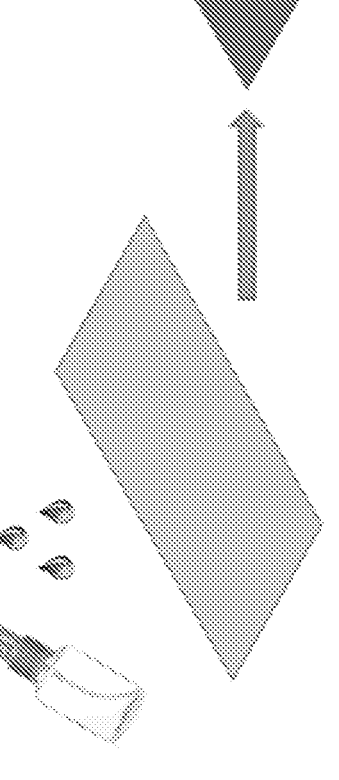
Proteoliposomes/liposomes    Soaking with MPD    Reacted with TMC

| Membrane type | Method | A (LMH/bar) | R | P (bar) | B (LMH) | B/A (bar) | Membrane surface area (cm²) | Lipid type | LPR (Molar ratio) | Lipid consumption (mg) | AQP consumption (mg) | Normalized AQP consumption (mg/m²) | |
|---|---|---|---|---|---|---|---|---|---|---|---|---|---|
| Flat sheet | spray | 2.6 | 0.975 | 10 | 0.63 | 0.24 | 42.0 | DOPC | 0 | 0.8 | 0 | 0 | Present Example |
| Flat sheet | spray | 4.0 | 0.985 | 10 | 0.45 | 0.11 | 42.0 | DOPC | 200 | 0.8 | 0.12 | 28.6 | Present Example |
| Flat sheet | spray | 6.2 | 0.965 | 10 | 2.2 | 0.34 | 42.0 | DOPC | 200 | 3.2 | 0.50 | 119 | Present Example |
| Flat sheet | spray | 8.1 | 0.915 | 10 | 7.7 | 0.89 | 42.0 | DOPC | 200 | 4.0 | 0.63 | 150 | Present Example |
| Flat sheet | IP | 4.0 | 0.97 | 5 | 0.62 | 0.15 | 42.0 | DOPC | 200 | 16 | 2.50 | 595 | Comparative example |
| Flat sheet | IP | 3.0 | 0.97 | 5 | 0.61 | 0.19 | 42.0 | DOPC | 0 | 16 | 0 | 0 | Comparative example |
| Flat sheet | IP | 4.1 | 0.97 | 10 | 1.17 | 0.28 | 42.0 | E.coli | 400 | 16 | 1.32 | 314 | Comparative example |
| Flat sheet | IP | 2.8 | 0.97 | 10 | 0.93 | 0.34 | 42.0 | E.coli | 0 | 16 | 0 | 0 | Comparative example |
| Hollow fiber | IP | 8.0 | 0.90 | 1 | 0.89 | 0.11 | 34.2 | DOPC | 100 | n.a. | n.a. | n.a. | Comparative example |
| Hollow fiber | IP | 2.8 | 0.88 | 1 | 0.38 | 0.14 | 34.2 | DOPC | 0 | n.a. | 0 | 0 | Comparative example |
| Hollow fiber | IP | 7.6 | 0.90 | 1 | 0.5 | 0.065 | 38.0 | E.coli | 320 | 30 | 3.09 | 813 | Comparative example |
| Hollow fiber | IP | 3.3 | 0.85 | 1 | 0.4 | 0.12 | 38.0 | E.coli | 320[a] | 30 | 3.09 [a] | 813[a] | Comparative example |

FABRICATION OF AQUAPORIN-BASED BIOMIMETIC MEMBRANE

CROSS-REFERENCE TO RELATED APPLICATION

This application claims the benefit of priority of Singapore Patent Application No. 10201900164Y, filed 8 Jan. 2019, the content of it being hereby incorporated by reference in its entirety for all purposes.

TECHNICAL FIELD

The present disclosure relates to methods of fabricating a membrane comprising proteoliposomes having protein water channels. The present disclosure also relates to such a membrane, and a system operable to carry out the methods.

BACKGROUND

Fresh water shortage is worsening due to increasing population and severe environmental contaminations. To produce more clean water, reverse osmosis (RO) and nano-filtration (NF) of wastewater and/or seawater using membranes have been developed over 40 years. Commercial RO and NF membranes that have been developed include thin-film composite (TFC) membranes.

Typically, a TFC membrane may have a layered structure, wherein a polyamide selective layer may be formed on top of a porous polymeric substrate having a woven/non-woven layer. The woven/non-woven layer acts as a support to increase mechanical strength of the TFC membrane. The polyamide selective layer may be the barrier critical for separation. The polyamide selective layer may usually be formed by interfacial polymerization. The chemistry and properties of the polyamide layer may be investigated and adjusted for commercial TFC membranes to produce high quality potable water from wastewater and seawater. Producing a high performance TFC membrane with high water permeability, high membrane selectivity, and/or low fouling, reduces chemical consumption, membrane area, operational cost and energy.

Having said the above, conventional methods for producing polyamide TFC membrane have limitations. For example, formation of the polyamide layer may compromise the structural integrity of aquaporins to be incorporated to the membrane or even damage the aquaporins. The aquaporins may also be exposed and not properly protected in the resultant membrane, which render the aquaporins easily damaged during wastewater treatment. Some conventional methods may utilize a significant amount of aquaporins.

There is thus a need to provide for a solution that ameliorates one or more of the limitations mentioned above. The solution should at least provide for a method of fabricating a membrane comprising proteoliposomes having protein water channels (e.g. aquaporins).

SUMMARY

In one aspect, there is provided for a method of fabricating a membrane comprising proteoliposomes having protein water channels, the method comprising:

providing a porous substrate;

depositing a solution on the porous substrate, wherein the solution comprises the proteoliposomes; and contacting the porous substrate with an aqueous monomer solution and an organic monomer solution to form a selective layer on the porous substrate embedding the proteoliposomes, wherein the solution is deposited prior to contacting the porous substrate with the aqueous monomer solution and the organic monomer solution.

In another aspect, there is provided for a method of fabricating a membrane comprising proteoliposomes having protein water channels, the method comprising:

providing a porous substrate;

contacting the porous substrate with an aqueous monomer solution;

depositing a solution on the porous substrate, wherein the solution comprises the proteoliposomes; and contacting the porous substrate with an organic monomer solution to form a selective layer on the porous substrate embedding the proteoliposomes, wherein the solution is deposited after contacting the porous substrate with the aqueous monomer solution but prior to contacting the porous substrate with the organic monomer solution.

In another aspect, there is provided for a membrane comprising:

a porous substrate comprising proteoliposomes deposited thereon, wherein the proteoliposomes have protein water channels incorporated therein; and a selective layer formed on the porous substrate, wherein the proteoliposomes are embedded in the selective layer.

In another aspect, there is provided for a system for fabricating a membrane comprising proteoliposomes having protein water channels, the system comprising:

a plurality of rollers operable to receive and move the porous substrate under a discharge module operable to deposit a solution on the porous substrate, wherein the solution comprises the proteoliposomes; and a contact module operable to have the porous substrate contact an aqueous monomer solution and an organic monomer solution to form a selective layer on the porous substrate.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which:

FIG. 2 is a schematic drawing of the spray process for preparing flat sheet ABMs.

FIG. 4 shows field emission scanning electron microscopy (FESEM) images of membrane substrate coated with lipids (top row) and proteoliposomes (bottom row). The scale bar denotes 500 nm.

FIG. 7 is a comparison of the performance of a RO membrane constructed with the present ABM (labeled present example) and conventional membranes (labeled as comparative example) constructed using conventional interfacial polymerization methods. "a" denotes that an aquaporin mutant was utilized.

FIG. 8 shows a plurality of rollers (802, 804) moving the porous substrate (808) to and under the discharge module (806) for the proteoliposomes to be sprayed thereon. Rollers (810, 812, 814, 816) then move the porous substrate (808) to the contact module (818) for forming the selective layer thereon, and rollers (820, 822, 824) move the porous substrate (808) therefrom. Rollers (802, 810, 814, 820) or rollers (804, 812, 816, 822, 824) may not be needed if a conveyor module (not shown), such as a conveyor belt, is used to move the porous substrate (808).

DETAILED DESCRIPTION

Figure 1:
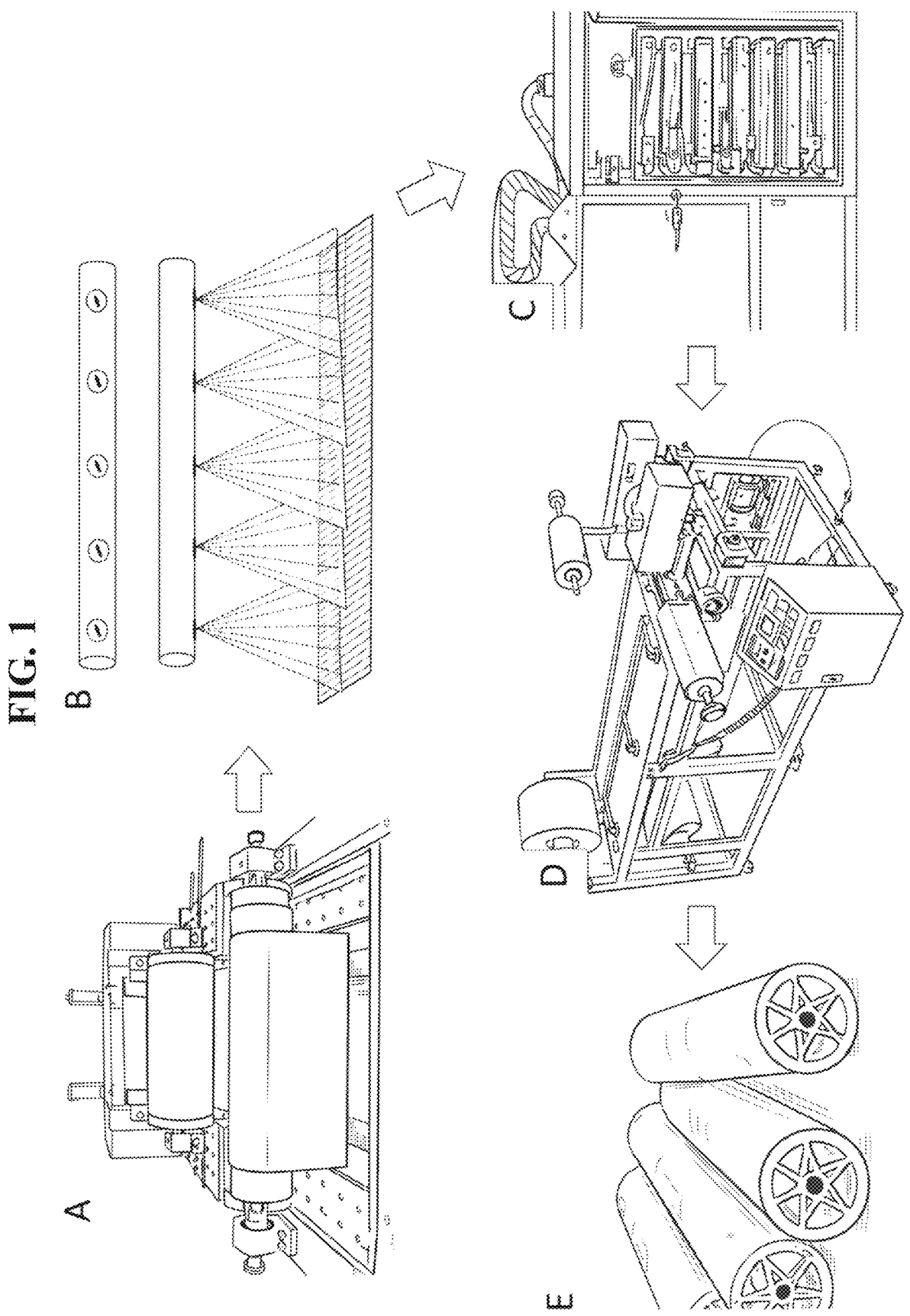
FIG. 1 is a schematic diagram depicting a system and the process of the system for fabricating a flat sheet biomimetic membrane incorporated with aquaporins (herein known as "aquaporin based biomimetic membrane" (ABM)). Image (A) shows the system and process for casting of the substrate membrane. Image (B) is a schematic layout of the spray system, depicting a row of nozzles for spreading proteoliposomes on the substrate membrane. Image (C) shows a polyamide coating system. Image (D) shows a membrane rolling machine. Image (E) shows the resultant spiral wound element comprising the biomimetic membrane.

The following detailed description refers to the accompanying drawings that show, by way of illustration, specific details and embodiments in which the invention may be practised. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to methods of fabricating aquaporin-based biomimetic membrane (ABM) involving a spray technique. The methods may include the steps of constructing a porous membrane substrate having improved mechanical strength and a porous surface, spraying an intermediate layer of proteoliposomes on the substrate, and forming a thin and dense selective layer covering the proteoliposomes via interfacial polymerization. Formation of the thin and dense selective layer after deposition of the proteoliposomes advantageously protects the proteoliposomes. The term "proteoliposomes" herein refers to liposomes incorporated with proteins that form water channels in the liposome membrane. The proteins may, for example, be an aquaporin (AQP). Such water channels may be termed herein as "protein water channels" as they are formed from proteins. The term "membrane substrate" and "substrate" may be used interchangeably herein to refer to a porous substrate which the proteoliposomes are deposited on and which the selective layer is formed thereon.

The methods may include the steps of depositing a solution comprising an aqueous monomer on the porous membrane substrate. The term "aqueous monomer" refers to a monomer that dissolves in an aqueous solution for interfacial polymerization. Such a solution containing the aqueous monomer may be termed herein "aqueous monomer solution". The proteoliposomes may then be deposited on the porous membrane substrate. The porous membrane substrate may then be contacted with a solution comprising an organic monomer to form the thin and dense selective layer on the porous substrate. The term "organic monomer" refers to a monomer that dissolves in an organic solvent for interfacial polymerization. Such a solution containing the organic monomer may be termed herein "organic monomer solution".

Contacting the aqueous monomer solution and the organic monomer solution may render interfacial polymerization to form the thin and dense selective layer. The thin and dense selective layer may be, for example, a polyamide formable by interfacial polymerization.

Both methods described above are advantageous as membranes having improved water permeability, flux and solute rejection are obtainable. As already mentioned above, the terms "solute rejection" and "salt rejection" may be used interchangeably in the present disclosure. The solute rejection of the membranes may be at least 98% with a high flux of at least 15 L m$^{-2}$ hr$^{-1}$, or even 99% with a flux of 16.7 L m$^{-2}$ hr$^{-1}$. Both methods described above do not compromise formation of the thin and dense selective layer, and advantageously require a significantly lower amount of protein water channels (e.g. aquaporins) to achieve the above performance as compared to traditional methods of fabricating ABMs. One example of traditional methods involve soaking the entire membrane substrate into a solution bath containing the proteoliposomes. To prepare such a solution bath and for the proteoliposomes to be deposited evenly on the membrane substrate, a significant amount of materials and cost may be undesirably incurred. Adversely, a high concentration of the proteoliposomes in the solution bath has to be prepared, and there is no guarantee that the proteoliposomes are even homogenously distributed in the solution bath in the first instance.

The present disclosure also describes a system operable to carry out the methods of the present disclosure.

Details of the present methods, membrane and system, and their various embodiments are described as follows.

In the first aspect of the present disclosure, there is provided for a method of fabricating a membrane comprising proteoliposomes having protein water channels. The method may comprise providing a porous substrate, depositing a solution on the porous substrate, wherein the solution comprises the proteoliposomes, and contacting the porous substrate with an aqueous monomer solution and an organic monomer solution to form a selective layer on the porous substrate embedding the proteoliposomes, wherein the solution may be deposited prior to contacting the porous substrate with the aqueous monomer solution and the organic monomer solution. The solution containing the proteoliposomes may be termed herein "proteoliposome solution" or "proteoliposomes solution". Embodiments and advantages described for the method of the first aspect can be analogously valid for the method of another aspect subsequently described herein, and vice versa.

Advantageously, the resultant membrane fabricated from the method of the first aspect has at least a water permeability of about 1.21 $L/m^2 \cdot hr \cdot bar$, at least a flux of about 15 $L/m^2 \cdot hr$, and at least a solute rejection of about 98%. The method of the first aspect, and even the method of a subsequent aspect disclosed herein, require less proteoliposomes and less protein water channels to achieve such performance compared to ABMs produced from traditional methods. The deposition of the proteoliposomes on the membrane substrate may be carried out by spraying. The spraying, for example, may be in a manner where the membrane substrate moves under a discharge module having nozzles configured thereon, such that the proteoliposomes discharged from the nozzles lead to a homogeneous coating of proteoliposomes on the surface of the membrane substrate as it moves, for example, under and across the nozzles. The spraying may be carried out by using a spray bottle to evenly coat the surface of the membrane substrate with proteoliposomes. As such, the present spraying technique renders the above advantage of having to use less proteoliposomes and less protein water channels, translating into cost savings.

Through the method of the first aspect, the proteoliposomes being deposited on the membrane substrate do not affect the aqueous monomer and the organic monomer, or vice versa. The solution comprising the proteoliposomes may cause precipitation of the organic monomer in the organic monomer solution. Precipitation of the organic monomer may inhibit interfacial polymerization, compromising formation of the selective layer. If the organic monomer comes into contact with the proteoliposomes or proteoliposome solution first, precipitation of the organic monomer may then undesirably occur. Moreover, depositing the proteoliposomes prior to deposition of the aqueous monomer solution and organic monomer solution advantageously forms a selective layer that protects the proteoliposomes, as the proteoliposomes get covered by (i.e. embedded in) the selective layer that is formed thereafter. As such, the proteoliposomes get shielded from chemicals by the selective layer during treatment of water.

In the method of the first aspect, depositing the solution may comprise moving the porous substrate unidirectionally under a discharge module which deposits the solution on the porous substrate. As mentioned above, the discharge module may have nozzles. The nozzles may be configured on the discharge module such that they spray the solution to cover the surface of the membrane substrate evenly with proteoliposomes as the membrane substrate moves, for example, under and across the discharge module. Unidirectional movement of the membrane substrate may help to minimize aggregation of the proteoliposomes sprayed thereon as the membrane substrate is deposited with the proteoliposome in a systematic manner. The membrane substrate may be processed through the discharge module once or more than once.

In various embodiments, the porous substrate may be formed of a polymer comprising polyetherimide, cellulose ester, polyacrylonitrile, polysulfone, polyethersulfone, polyvinylidene fluoride, cellulose acetate, or a derivative thereof.

In various embodiments, the porous substrate may be formed of an inorganic material comprising carbon, titanium, aluminum oxide, or ceramic.

In the method of the first aspect, depositing the solution may comprise spraying the solution to cover a surface of the porous substrate with the proteoliposomes. Advantages of spraying the proteoliposome solution have already been discussed above. For example, spraying the proteoliposome solution helps to reduce the amount of proteoliposomes required, and even the protein water channels required, without compromising filtration performance of the resultant membrane.

In various embodiments, the solution may comprise the proteoliposomes in a concentration ranging from 1 mg/ml to 100 mg/ml, 10 mg/ml to 100 mg/ml, 20 mg/ml to 100 mg/ml, 30 mg/ml to 100 mg/ml, 40 mg/ml to 100 mg/ml, 50 mg/ml to 100 mg/ml, 60 mg/ml to 100 mg/ml, 70 mg/ml to 100 mg/ml, 80 mg/ml to 100 mg/ml, 90 mg/ml to 100 mg/ml, 2 mg/ml to 10 mg/ml, etc. Such concentrations avoid aggregation of proteoliposomes. Higher concentrations may render the proteoliposomes susceptible to aggregation, which may decrease a membrane's performance. Such concentrations may also help to reduce cost without reducing filtration performance of the resultant membrane.

The solution may further comprise a (i) surfactant and/or (ii) a salt, wherein the surfactant may comprise n-octyl-P-D-glucoside, n-octanoylsucrose, n-nonanoylsucrose, n-decanoylsucrose, n-undecyl-P-D-glucopyranoside, n-undecyl-P-D-thioglucoside, n-undecyl-β-O-thiomaltoside, n-undecyl-P-D-thiomaltopyranoside, n-undecyl-β-O-thioglucopyranoside, or a combination thereof, wherein the salt may comprise sodium chloride, magnesium chloride, monosodium phosphate, or a combination thereof. The surfactant may be present in the solution at a concentration ranging from 0.0002 wt % to 2 wt %, 0.001 wt % to 2 wt %, 0.01 wt % to 2 wt %, 0.02 wt % to 1 wt %, 0.5 wt % to 2 wt %, etc. The salt may be present in the solution at a concentration ranging from 0.001 M to 0.5 M, 0.005 M to 0.5 M, 0.01 M to 0.05 M, 0.01 M to 0.1 M, 0.01 M to 0.5 M, 0.01 M to 0.2 M, etc. The concentration of the surfactant and/or salt may affect the membrane's performance. This, however, may depend on the type of surfactant and salt used.

In the method of the first aspect, contacting the porous substrate with the aqueous monomer solution and the organic monomer solution may comprise soaking the porous substrate in the aqueous monomer solution prior to soaking the porous substrate in the organic monomer solution. As mentioned above, if the organic monomer solution is contacted first, there may be a risk of the organic monomer precipitating, that in turn inhibits interfacial polymerization between the aqueous monomer and the organic monomer. Therefore, this step circumvents such risk.

In the method of the first aspect, contacting the porous substrate with an aqueous monomer solution and an organic monomer solution may comprise (i) dissolving a polyfunctional amine in an aqueous solution to form the aqueous monomer solution, and (ii) dissolving a polyfunctional acyl chloride or a polyfunctional sulfonyl chloride in an organic solvent to form the organic monomer solution. The prefix "poly" in the term "polyfunctional" herein refers to more than one functional groups. For example, a polyfunctional amine means there may be more than one amine group.

In various embodiments, the polyfunctional amine may comprise o-phenylenediamine, m-phenylenediamine, or piperazine. In various embodiments, the polyfunctional acyl chloride may comprise trimesoyl chloride, isophthaloyl chloride (IPC), 5-isocyanato-isophthaloyl chloride (ICIC), or 5-chloroformyloxy-isophthaloyl chloride (CFIC). In various embodiments, the polyfunctional sulfonyl chloride may comprise 1,5-naphthalene-bisulfonyl chloride, 1,3-dimethyl 2-imidazolidinone, or 1,3-dioxo-1,3-dihydroisobenzofuran-5-sulfonyl chloride.

The method of the first aspect may further comprise drying the porous substrate having the solution deposited thereon before contacting the porous substrate with the aqueous monomer solution and the organic monomer solution. The drying process advantageously maintains the concentration of the aqueous monomer, as any remaining water on the substrate may dilute its concentration.

In another aspect of the present disclosure, there is provided for a method of fabricating a membrane comprising proteoliposomes having protein water channels. The method may comprise providing a porous substrate, contacting the porous substrate with an aqueous monomer solution, depositing a solution on the porous substrate, wherein the solution comprises the proteoliposomes, and contacting the porous substrate with an organic monomer solution to form a selective layer on the porous substrate embedding the proteoliposomes, wherein the solution may be deposited after contacting the porous substrate with the aqueous monomer solution but prior to contacting the porous substrate with the organic monomer solution. This method is similar to the method of the first aspect in that the solution containing the proteoliposome may be deposited by spraying onto the membrane substrate. This method, however, has the aqueous monomer solution deposited first, then the solution containing the proteoliposome, and then the organic monomer solution. A membrane fabricated from the method of the current aspect has at least a water permeability of about 1.26 L/m$^2$·hr·bar, at least a flux of about 16.72 L/m$^2$·hr, and at least a solute rejection of about 99%. The proteoliposomes may be better incorporated to the aqueous monomer, and hence the selective layer, as the proteoliposomes are deposited before the organic monomer but after the aqueous monomer, further improving membrane's performance.

Similarly, the method of the current aspect advantageously reduces the amount of proteoliposomes and the protein water channels required to produce better results compared to a ABM fabricated from traditional methods, one of which involving a solution bath has been described above. As the proteoliposomes may be deposited into the aqueous monomer solution or the layer containing the aqueous monomer on the membrane substrate, the proteoliposomes, likewise, get shielded after the organic monomer gets deposited thereon for interfacial polymerization to form the selective layer. The method in the current aspect therefore affords the same protection of the proteoliposomes as described in the method of the first aspect. Other embodiments and advantages described for the method of the first aspect can be analogously valid for the method in the current aspect as described herein, and vice versa. As the various embodiments and advantages have already been described above, they shall not be iterated for brevity. As another example, embodiments and advantages of the spraying technique in the method of the first aspect have already been described above, such as the discharge module and the nozzles for homogenous coating of proteoliposomes on the membrane substrate, which can be analogously valid for the spraying technique in the method of the current aspect. As such, the embodiments and advantages of the spraying technique in the method of the current aspect shall not be iterated.

Similar to embodiments and advantages of the method in the first aspect, depositing the solution in the method of the current aspect may comprise moving the porous substrate unidirectionally under a discharge module which deposits the solution on the porous substrate.

Similar to embodiments and advantages of the method in the first aspect, the porous substrate in the method of the current aspect may be formed of a polymer comprising polyetherimide, cellulose ester, polyacrylonitrile, polysulfone, polyethersulfone, polyvinylidene fluoride, cellulose acetate, or a derivative thereof. The porous substrate may be formed of an inorganic material comprising carbon, titanium, aluminum oxide, or ceramic.

Similar to embodiments and advantages of the method in the first aspect, depositing the solution in the method of the current aspect may comprise spraying the solution to cover a surface of the porous substrate with the proteoliposomes. The solution may comprise the proteoliposomes in a concentration ranging from 1 mg/ml to 100 mg/ml. Other embodiments, and advantages, of the solution have already been described above, and shall not be iterated for brevity. For example, the solution may further comprise a (i) surfactant and/or (ii) a salt, wherein the surfactant may comprise n-octyl-P-D-glucoside, n-octanoylsucrose, n-nonanoylsucrose, n-decanoylsucrose, n-undecyl-P-D-glucopyranoside, n-undecyl-P-D-thioglucoside, n-undecyl-β-O-thiomaltoside, n-undecyl-P-D-thiomaltopyranoside, n-undecyl-β-O-thioglucopyranoside, or a combination thereof, wherein the salt may comprise sodium chloride, magnesium chloride, monosodium phosphate, or a combination thereof. The surfactant may be present in the solution at a concentration ranging from 0.0002 wt % to 2 wt %, etc. The salt may be present in the solution at a concentration ranging from 0.001 M to 0.5 M, etc.

Similar to embodiments and advantages of the method in the first aspect, contacting the porous substrate with the aqueous monomer solution in the method of the current aspect may comprise dissolving a polyfunctional amine in an aqueous solution to form the aqueous monomer solution. The polyfunctional amine may comprise o-phenylenediamine, m-phenylenediamine, or piperazine.

Similar to embodiments and advantages of the method in the first aspect, contacting the porous substrate with the organic monomer solution in the method of the current aspect may comprise dissolving a polyfunctional acyl chloride or a polyfunctional sulfonyl chloride in an organic solvent to form the organic monomer solution. The polyfunctional acyl chloride may comprise trimesoyl chloride, isophthaloyl chloride (IPC), 5-isocyanato-isophthaloyl chloride (ICIC), or 5-chloroformyloxy-isophthaloyl chloride (CFIC). The polyfunctional sulfonyl chloride may comprise 1,5-naphthalene-bisulfonyl chloride, 1,3-dimethyl 2-imidazolidinone, or 1,3-dioxo-1,3-dihydroisobenzofuran-5-sulfonyl chloride.

The method of the current aspect may further comprise drying the porous substrate having the solution deposited thereon before contacting the porous substrate with the organic monomer solution. The drying process avoids dilution of the aqueous monomer from water that may remain on the porous substrate.

The present disclosure further provides for a membrane comprising a porous substrate comprising proteoliposomes deposited thereon, wherein the proteoliposomes have protein water channels incorporated therein, and a selective layer formed on the porous substrate, wherein the proteoliposomes are embedded in the selective layer. Embodiments and advantages described for the methods of the above aspects can be analogously valid for the present membrane as described herein, and vice versa. As the various embodiments and advantages have already been described above, they shall not be iterated for brevity.

In various embodiments, the porous substrate may be formed of a polymer comprising polyetherimide, cellulose ester, polyacrylonitrile, polysulfone, polyethersulfone, polyvinylidene fluoride, cellulose acetate, or a derivative thereof. The porous substrate may be formed of an inorganic material comprising carbon, titanium, aluminum oxide, or ceramic.

In various embodiments, each of the proteoliposomes may comprises a ratio of protein water channels to lipids ranging from 1:100 to 1:1000, 1:200 to 1:1000, 1:400 to 1:1000, 1:200 to 1:400, etc. These ranges help to mitigate defects in the membrane of the liposomes so as to avoid poorer separation effectiveness, and improve separation efficiency. For instance, when more lipids are used, water permeability and flux may suffer. When more protein water channels are incorporated into the liposomes, packing defects in the liposomes may occur and separation effectiveness may suffer.

The proteoliposomes may have an average diameter ranging from 50 nm to 400 nm, 80 nm to 120 nm, 100 nm, etc. Such average diameter allows for the proteoliposomes to be embedded in the selective layer so that a significantly thick and dense selective layer need not be formed. If the selective layer gets too thick and dense just to protect proteoliposomes of bigger sizes, water permeability and flux may be compromised. Adversely, significantly more proteoliposomes may have to be incorporated just to compensate for the presence of a thicker and denser selective layer.

In various embodiments, the proteoliposomes deposited on the porous substrate may be present in an amount ranging from 0.8 mg/m$^2$ to 1000 mg/m$^2$, 1 mg/m$^2$ to 1000 mg/m$^2$, 100 mg/m$^2$ to 1000 mg/m$^2$, 150 mg/m$^2$ to 1000 mg/m$^2$, 20 mg/m$^2$ to 1000 mg/m$^2$, 500 mg/m$^2$ to 1000 mg/m$^2$, etc. Such ranges improve the overall flux of the resultant membrane as the proteoliposomes get evenly spread out across the membrane. The spraying technique in the methods of both aspects described above deposits the proteoliposomes in such a manner.

In various embodiments, the protein water channels may comprise aquaporins, aquaglyceroporins, ion channel proteins, or analogues thereof. This applies to the methods of the both aspect described above.

In various embodiments, the selective layer may have a thickness ranging from 50 nm to 1500 nm, 100 nm to 1500 nm, 1000 nm to 1500 nm, etc. This applies to the methods of the both aspect described above. Such thicknesses provide ample coverage of the proteoliposomes, advantageously protecting and shielding the proteoliposomes as already mentioned above. The selective layer may comprise or consist of a polyamide.

In various embodiments, the membrane may be a flat sheet membrane or a spiral wound membrane. This applies to the methods of the both aspect described above.

The present disclosure further provides for a system for fabricating a membrane comprising proteoliposomes having protein water channels. The system may comprise a plurality of rollers (802, 804) operable to receive and move the porous substrate (808) under a discharge module (806) operable to deposit a solution on the porous substrate (808), wherein the solution comprises the proteoliposomes, and a contact module (818) operable to have the porous substrate (808) contact an aqueous monomer solution and an organic monomer solution to form a selective layer on the porous substrate (808). Embodiments and advantages described for the methods and membrane of the above aspects can be analogously valid for the present system described herein, and vice versa. As the various embodiments and advantages have already been described above, they shall not be iterated for brevity. The present system is operable to accommodate the methods of both aspects described above.

The plurality of rollers (802, 804, 810, 812) may be arranged to receive the porous substrate (808) at a first position and a second position, wherein the first position and the second position may be arranged away from the discharge module (806), and wherein the plurality of rollers (802, 804, 810, 812) may be operable to move the porous substrate (808) under the discharge module (806) from the first position to the second position. Such operation and configuration of the plurality of rollers (802, 804, 810, 812) provide for unilateral movement of the membrane substrate (808), for example, under and across the discharge module (806), which has already described above. The advantages of this shall not be iterated for brevity, as they have already been described in the method of the first aspect.

The first position may comprise one or more rollers (802, 804) operable to receive the porous substrate (808). Said differently, the porous substrate (808) may be fed to the discharge module (806) at the first position. The roller(s) (802, 804) may rotate or operate in a manner to move the porous substrate (808) to the nozzles of the discharge module (806) for the solution containing proteoliposomes to be sprayed thereon. The one or more rollers (802, 804) at the first position may be termed first set of roller(s). As the porous substrate (808) moves therefrom, it may come into contact with a second set of roller(s) (810, 812) at the second position, wherein the second set may have one or more rollers. As the porous substrate (808) having the proteoliposomes sprayed thereon is fed to the second set of roller(s), the second set of roller(s) helps move the porous substrate (808) away from the discharge module (806). In embodiments where the first position and the second position each has one roller, there may be a conveying module, such as a conveyer belt, to move the porous substrate (808) to and away from the discharge module (806). These embodiments are applicable to methods of both aspects described above.

The discharge module (806) may comprise one or more nozzles arranged to have a surface of the porous substrate (808) covered with the proteoliposomes when the solution is sprayed from the one or more nozzles on the porous substrate (808) moving under the discharge module (806). Advantageously, the nozzles are spaced apart on the discharge module (806) so that the spraying of the proteoliposomes thereon evenly covers the surface of the porous substrate (808).

In the present system, the contact module (818) may be operable to have the porous substrate (808) contact the aqueous monomer solution prior to (i) contacting the organic monomer solution or (ii) contacting the solution. In other words, the system is operable to accommodate methods of both aspects described above. The present system may be operated to carry out the method of the first aspect, or the method of the subsequent aspect, both of which have already been described above.

In various embodiments, the system may further comprise a casting module operable to form the porous substrate (808), wherein the casting module comprises a reservoir designed to contain a coagulation liquid which renders formation of the porous substrate (808) from a polymer solution. Further details of the coagulation liquid and polymer solution are described in the examples of the present disclosure. An example of the casting module is shown in image (A) of FIG. 1.

In the present disclosure, the word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to spraying methods introduced to fabricate aquaporin based biomimetic membranes (ABMs). The resultant membranes exhibit a high water permeability and high solute rejection just based on the presence of a small amount of aquaporin incorporated (around $\frac{1}{10}$ of the amount of aquaporin conventionally used).

In the present methods, separation of the step of incorporating aquaporin from interfacial polymerization (IP) advantageously protects integrity of the aquaporin proteoliposomes from the harsh IP reaction conditions. The present spraying methods also significantly reduce the cost of aquaporin based biomimetic membrane. In addition, the amount of aquaporin incorporated in the membrane may be pre-determined.

The present methods provide for development of a high performance aquaporin-based thin film composite membrane to treat different low salinity wastewaters (e.g. contaminated surface waters, biological-treated wastewater effluents, oil-contaminated wastewaters, industrial process waters) and high salinity water (e.g. seawater).

The present disclosure also relates to a membrane obtained by the present methods, and a system operable according to the present methods.

Details of the present methods, membrane and system, are further discussed, by way of non-limiting examples set forth below.

Example 1A: General Description of System

The present disclosure describes a method to produce interfacially polymerized ABMs in a cost effective manner compared to conventional methods.

The scheme depicting the present method is illustrated in FIG. 1.

Before soaking the membrane substrate, or a surface of the membrane substrate, in an aqueous monomer solution, the proteoliposome solution was sprayed on the membrane substrate's surface. After drying by nitrogen, the surface was exposed to the aqueous monomer solution for a certain time followed by an organic phase polymerization reaction procedure. The present spray method can be easily scaled up and consumes less aquaporins (AQPs) to obtain a membrane that has similar performance compared to a membrane obtained by traditional interfacial polymerization method. This demonstrates the significant potential of the present method to reduce overall cost of ABM production.

The scaling up of flat sheet ABMs can be accomplished by modifying a reverse osmosis (RO) membrane fabrication process to add a simple step of AQP spraying (image B), as shown in FIG. 1.

Example 1B: Materials and Chemicals

In various examples and embodiments disclosed herein, the following materials were used as non-limiting examples to demonstrate for the present methods, membrane and system.

1,2-dioleoyl-sn-glycero-3-phosphocholine (DOPC, 20 mg/ml, Avanti Polar Lipids, Alabama, USA) was used as lipid to incorporate the aquaporin (AQP) protein (i.e. aquaporin). The aquaporin can be produced according to a conventional method. A buffer solution (phosphate buffered saline (i.e. PBS solution) of pH about 7.4) was used to rehydrate the DOPC lipid. Bio-beads (Bio-rad laboratories, USA) were used to remove n-octyl-b-D-glucopyranoside (OG, ultrapure grade, Merck, Germany) during proteoliposome reconstitution. For proteoliposome characterization, analytical grade sodium chloride (NaCl) having a purity of over 99% was purchased from Merck (Germany) and used for the stopped-flow test. Deionized (DI) water (Millipore, integrated ultrapure water system) was used to prepare all the solutions unless other wise specified.

For the ABM membrane fabrication, a non-woven support was used to increase mechanical strength of the ABM membrane. Polysulfone (PS, molecular weight of about 75 kDa to about 81 kDa, Solvay Advanced Polymers, GA, USA) was dissolved in N-methyl-2-pyrrolidone (NMP, Merck) to form a polymer solution. For the process of interfacial polymerization, the m-phenylene-diamine (MPD) and trimesoyl chloride (TMC), both purchased from Sigma-Aldrich, were used as the aqueous and organic monomers, respectively. The DI water was used as the solvent for the aqueous monomers and n-hexane (Fisher Scientific) was the solvent for the organic monomers, respectively.

Example 2A: Proteoliposome Preparation

The DOPC proteoliposomes can be prepared as follows. Briefly, 10 mg of DOPC liposomes was dried by nitrogen gas followed by storage in a vacuum desiccator for at least 12 hours. The PBS buffer solution with 1 wt % OG dissolved the dried liposome together with a certain amount of AQPs. The final volume is 1 ml. The solution was freeze-thawed three times followed by extruding 21 times using a 400 nm filter (Avestin extruder, Avestin, Canada). Then, the bio-beads were added into the solution and vortexed for at least 3 hours to remove the OG. Finally, the solution (containing the proteoliposomes) was extruded using a 200 nm filter for 11 times to obtain a uniform size and distribution of pro-teoliposomes. The final solution concentration was 10 mg/ml of DOPC proteoliposomes given that 10 mg of DOPC liposomes were present in 1 ml of the resultant proteoliposome solution.

Example 2B: ABM Membrane Synthesis

The membrane substrate can be prepared by any suitable membrane casting methods for forming a flat sheet membrane. The selective layer was prepared via interfacial polymerization. In the present example, a customized spray bottle was used to spray the proteoliposome solution onto an A5 size polysulfone membrane substrate having a surface area of 310.8 cm$^2$. After that, the MPD solution was used to soak the surface of the membrane substrate. After removing excess MPD solution with N$_2$ gas, the remaining MPD was contacted with a TMC solution to react and form the polyamide layer, which took several minutes to complete. During the reaction, the proteoliposomes or liposomes were embedded into the polyamide layer. The resultant membranes were then kept in DI water overnight. Accordingly, ABM membranes incorporated with proteoliposomes and ABM membranes incorporated with lipids were fabricated. For comparison, membranes without any proteoliposomes were fabricated.

Example 3: Characterization of Liposomes, Proteoliposomes and Membranes

Dynamic light scattering (DLS) measurement was performed using a Nano Zetasizer (NanoZS, Malvern Instruments Limited, UK) to determine sizes of the liposome and proteoliposome vesicles. A stopped-flow instrument (SX20 stopped-flow spectrometer, Applied Photophysics, UK) was used to characterize the activity of the liposomes and proteoliposomes. 0.3 M NaCl was dissolved in a PBS buffer solution for use as a draw solution and a 0.5 mg/ml proteo-lipsomes solution was used as the feed solution during the stopped-flow measurement. A fitted rising rate was obtained by fitting using single exponential method in the system. The morphologies of proteoliposomes and liposomes were characterized using transmission electron microscope (TEM, JEOL JEM-1400 Plus Electron Microscope, USA).

The membrane substrate, membrane substrate's surface deposited with DOPC proteoliposomes, and membrane substrate's surface after interfacial polymerization were characterized by FESEM (Field emission scanning electron microscopy, JSM-7600F, JEOL, Japan). Before characterization, all membranes were dried in vacuum desiccators for at least 24 hours.

Example 4: Evaluation of Membrane Separation Properties

The resultant membranes were evaluated by a cross flow RO setup. The water permeability (A) was obtained by using DI water as feed solution under an applied pressure of 10 bar (1 MPa). The solute (or salt) rejection (R) was measured by adding 10 mM NaCl into the feed tank. The measured membrane area is 42 cm$^2$ in a membrane testing cell (CF42 Membrane Cell, Sterlitech). A diamond shape spacer was used to minimize the concentration polarization. A constant cross flow velocity of about 10 cm/s was applied during the testing. Before any measurements, at least 2 hours compaction was applied in order to get a stable water flux and salt rejection. The A and R were determined by equations (1) and (2) below, respectively:

$$A=J_v/P \tag{1}$$

$$R=1-C_p/C_f \tag{2}$$

Based on A and R, the solute permeability (B) can be determined by equation 3 below.

$$B=A(P)(1/R-1) \tag{3}$$

In equations (1) to (3), J$_v$ denotes the water flux, which was determined by the gravimetric method, P denotes the applied pressure. C$_p$ and C$_f$ are the permeate and feed conductivity, respectively, which were measured by a conductivity meter (Ultrameter II, Myron L Company, Carlsbad, CA).

Example 5: Demonstration of Present Methods and Membrane

The requirements of a suitable membrane substrate include high mechanical strength, which can be through addition of a non-woven or woven support. The substrate should be a porous substrate compatible for forming a polyamide layer thereon. Materials used for such a membrane substrate include polymers, inorganic materials, or a combination thereof. Non-limiting examples of polymers include polyetherimide (PEI), cellulose ester, polyacrylonitrile (PAN), polysulfone (PS), polyethersulfone (PES), poly-vinylidene fluoride (PVDF), cellulose acetate, and derivatives thereof. Non-limiting examples of inorganic materials include ceramic, carbon, titanium, and aluminum oxide.

The concentration of the polymer solution used to prepare the membrane substrate was from 10.0 to 30.0 wt % (or 15.0 to 25.0 wt %). Solvents used can include 1-methyl-2-pyrrolidinone (NMP), dimethyl-acetamide (DMAc), dimethyl formamide (DMF), and/or a combination thereof. Organic macromolecule, organic small molecule and inorganic salts, such as polyvinyl pyrrolidone (PVP), polyethylene glycol (PEG), acetone, isopropanol, ethanol, lithium chloride (LiCl), etc. can be used as additives to adjust membrane porosity and/or hydrophobicity-hydrophilicity. Such additives can have a concentration in the polymer solution ranging from 0.1 to 50.0 wt % (or 0.2 to 20.0 wt %).

Room temperature distilled water with a certain ratio of solvents was used as coagulant bath to precipitate the flat sheet membrane substrate. The added solvents were selected from NMP, DMAc, DMF, etc., of which the concentration ranged from 0 to 80.0 wt. % (or 0 to 50.0 wt %). During preparation of the polymer solution, a certain amount of polymer and additives in the organic solvent were mixed in a sealed container at room temperature (e.g. 23±3° C.) or heated up to 90° C. (or 50° C. to 70° C.) until the polymer solution becomes homogenous. The polymer solution was degassed statically in the same container for at least 24 hours, after cooling down to room temperature for the heated polymer solution.

The polymer solution was then spread directly on a clean glass plate (optionally adding non-woven or woven support on the top of glass plate before spreading) by an Elcometer 4340 Motorised Film Applicator (Elcometer (Asia) Pte Ltd) to form a polymer solution film of a certain thickness. The resulting polymer solution film was immersed into the coagulation water bath promptly and smoothly. After the polymer solution film precipitates and solidifies, excess solvent and additives were removed by soaking the substrate in deionized water.

The proteoliposomes used in the present disclosure are based on protein water channels incorporated into lipids to form the proteoliposome vesicles. Non-limiting examples of the protein water channels include, but are not limited to, aquaporins, aquaglyceroporins, other channel proteins, ion channel proteins, and/or analogues thereof. The proteoliposomes can be formed by a film hydration method with detergent-assisted aquaporin incorporation, involving steps such as vortexing, one or more cycles of freeze-thawing, extrusion, and/or dialysis. The molar ratio of lipids to the protein water channels (e.g. aquaporin) can be 1000:1 to 100:1, or 200:1 to 400:1, etc.

In the spraying step, the proteoliposomes were sprayed evenly on the membrane substrate and dried by using $N_2$, or other inert gases, heating, or using an absorbent material (tissue paper). A spray machine (or termed herein as "discharge module") operable to deliver (spray) fine drops of liquids and ensure even distribution on the substrate is used. The spray solution can contain a high concentration of proteoliposomes, e.g. ranging from 1 mg/ml to 100 mg/ml (or 2 mg/ml to 10 mg/ml).

Surfactants may be included in the spray solution, non-limiting examples of which include, n-octyl-P-D-glucoside, n-octanoylsucrose, n-nonanoylsucrose, n-decanoylsucrose, n-undecyl-P-D-glucopyranoside, n-undecyl-P-D-thiogluco-side, n-undecyl-β-O-thiomaltoside, n-undecyl-P-D-thio-maltopyranoside, n-undecyl-β-O-thioglucopyranoside, or a combination thereof. The concentration of surfactants in the spray solution can range from 0.0002 wt % to 2 wt % (or 0.02 wt % to 1 wt %).

In addition, some salts may be included in the spray solution, non-limiting examples of which include, NaCl, $MgCl_2$, $NaH_2PO_4$, $Na_2HPO_4$, or a combination thereof. The concentration of the salt in the spray solution can range from 0.001 M to 0.5 M (or 0.01 M to 0.2 M). The salts are added into the spray solution to serve as a pH buffer, rendering a more favorable environment for the proteoliposomes and the protein water channels in the proteoliposomes (e.g. aquaporins).

The monomers used for interfacial polymerization were chosen from polyfunctional amines for the aqueous monomer, and polyfunctional acyl chlorides or polysulfonyl-choride for the organic monomer.

Non-limiting examples of a polyfunctional amine include o-phenylenediamine (OPD), m-phenylenediamine (MPD), piperazine, etc. The concentration of such a monomer can range from 0.001 wt % to 10 wt % (or 0.01 wt % to 5 wt %).

Non-limiting examples of a polyfunctional acyl chlorides or polysulfonylchoride include trimesoyl chloride (TMC), 1,5-naphthalene-bisulfonyl chloride, etc. The concentration of such an organic monomer can range from 0.00001 wt % to 2 wt % (or 0.001 wt % to 1 wt %).

The amines were dissolved in water, and the polyfunctional acyl chlorides or polysulfonylchoride were dissolved in an organic solvent, such as n-hexane, cyclohexane, isopar series, etc. Other additives were selectively added into the aqueous monomer solution or organic monomer solution, wherein the additives were chosen from (i) organic small molecules and/or macromolecules and (ii) surfactants, such as sodium dodecyl sulfate (SDS), e-caprolactam (CL), tri-ethylamine (TEA), or a combination thereof, and n-octyl-P-D-glucoside, n-octanoylsucrose, n-nonanoylsucrose, n-decanoylsucrose, or a combination thereof, respectively, so as to modify water permeability and solute rejection of the selective layer that protects the proteoliposomes deposited on the membrane substrate.

Post-treatment of the aquaporin-based thin-film composite membrane can be a chemical method or a physical method, such as but not limited to, coating, grafting, heating, exposure to ultraviolet radiation, layer-by-layer assembly, etc. The purpose of post-treatment is to further cross-link the polyamide layer, improving the resultant membrane's anti-fouling property. One example was to coat and graft materials of a vinyl addition polymer, e.g. polyvinyl alcohol (PVA), polyvinyl amine (PVM), poly(acrylamide) (PAAM), and/or a derivative thereof, wherein their concentration can range from 0.01 wt % to 50 wt % (or 0.05 wt % to 20 wt %). In another example, a carboxylic acid addition polymer, such as polyacrylic acid (PAA), poly(methacrylic acid) (PMAA), and/or a derivative thereof, can be used, wherein their concentration can range from 0.01 wt % to 50 wt % (or 0.05 wt % to 20 wt %). In another example, inorganic salts, such as NaCl, $MnCl_2$, NaBr, $CaCl_2$, etc., can be present in the coating solution, wherein their concentration can range from 0 M to 2.5 M (or 0.3 M to 1 M). Such salts present in the coating solution may have an effect on the crosslinking. Glutaraldehyde, maleic acid, and/or a derivative thereof, can be present in the coating solution as a crosslinking agent, wherein their concentration can range from 0.001 wt % to 50 wt % (or 0.01 wt % to 20 wt %).

During the coating process, the membrane can be soaked, sprayed, immersed into the coating solution for a certain time, which is ranged from several seconds to several days (e.g. 10 s to 24 hours). The temperature during the coating and after coating process has to be monitored. The temperature during the coating ranged from 15° C. to 90° C. (or 20° C. to 70° C.). The temperature after the coating ranged from 40° C. to 120° C. (or 50° C. to 80° C.) and time should be about several seconds to several hours (or 10 s to 1 hour).

Example 6: Results and Discussion—Characteristics of DOPC Liposomes and Proteoliposomes Transmission electron microscope (TEM) images (FIGS. 3A and 3B) display the morphology of dry liposomes and proteoliposomes, respectively. Spherical hollow structures of liposomes were successfully self-assembled with an average size about 100 nm. However, the size of proteoliposomes appears to be only about 50 nm and aggregated together. The apparent size of liposomes and proteoliposomes are smaller than the size obtained from DLS (Table 1 below). It should be noticed that the drying procedure during the TEM sample preparation likely induced dewatering and shrinking of the vesicles, leading to smaller diameters when observed under TEM.

TABLE 1

| Stopped flow and DLS results of DOPC lipid andproteoliposome | | | | |
|---|---|---|---|---|
| Type | Diameter (nm) | PDI (dimensionless) | K 1/s | $P_f$ (cm/s) |
| Liposome | 114.3 | 0.198 | 13 | 0.0092 |
| Proteolipsome PLR 1:400 | 105 | 0.102 | 80 | 0.052 |

TABLE 1-continued

Stopped flow and DLS results of DOPC lipid andproteoliposome

| Type | Diameter (nm) | PDI (dimensionless) | K 1/s | $P_f$ (cm/s) |
|---|---|---|---|---|
| Proteolipsome PLR 1:200 | 77.2 | 0.093 | 140 | 0.067 |
| Proteolipsome PLR 1:100 | 79.3 | 0.186 | 37 | 0.018 |

For the stopped-flow experimental conditions, the NaCl solution used had an osmolarity of 993 mosm/L, the PBS buffer solution containing the vesicles had an osmolarity of 281 mosm/L. The stopped-flow measurements were performed by mixing an equal volume of the draw solution and the vesicles, which gave an osmolarity difference of 356 mosm/L across the vesicles.

The size and water permeability of liposome, proteoliposome with different protein to lipid ratio (a molar ratio, abbreviated PLR) are shown in Table 1. Overall, all the vesicles (i.e. liposomes and proteoliposomes) have sizes ranging from 80 nm to 120 nm, and the size distributions are quite narrow, as observed from the small polydispersity index (PDI<0.2). The liposomes only exhibited 13 l/s of K (kinetic rate constant for vesicle shrinkage) and 0.0092 cm/s of water permeability due to the impermeability of lipid bilayer. Conversely, proteoliposomes showed much higher K value and water permeability due to the high water permeability of the active AQPs. By increasing the AQPs incorporated in the resultant membrane (i.e. increasing PLR), the water permeability increased at first, and decreased unexpectedly when PLR increased to 1:100. The higher PLR helps to increase the number of AQPs inside the vesicles. On the other hand, further increasing PLR may lead to packing defects and resulted in a membrane that is suitable for separation processes having less demanding requirements. Therefore, the PLR selected, for example, was at 1:200 when applying the proteolipsome for preparation of subsequent membrane samples.

Example 7: Results and Discussion—Characteristics of ABM Membranes

Figure 4:
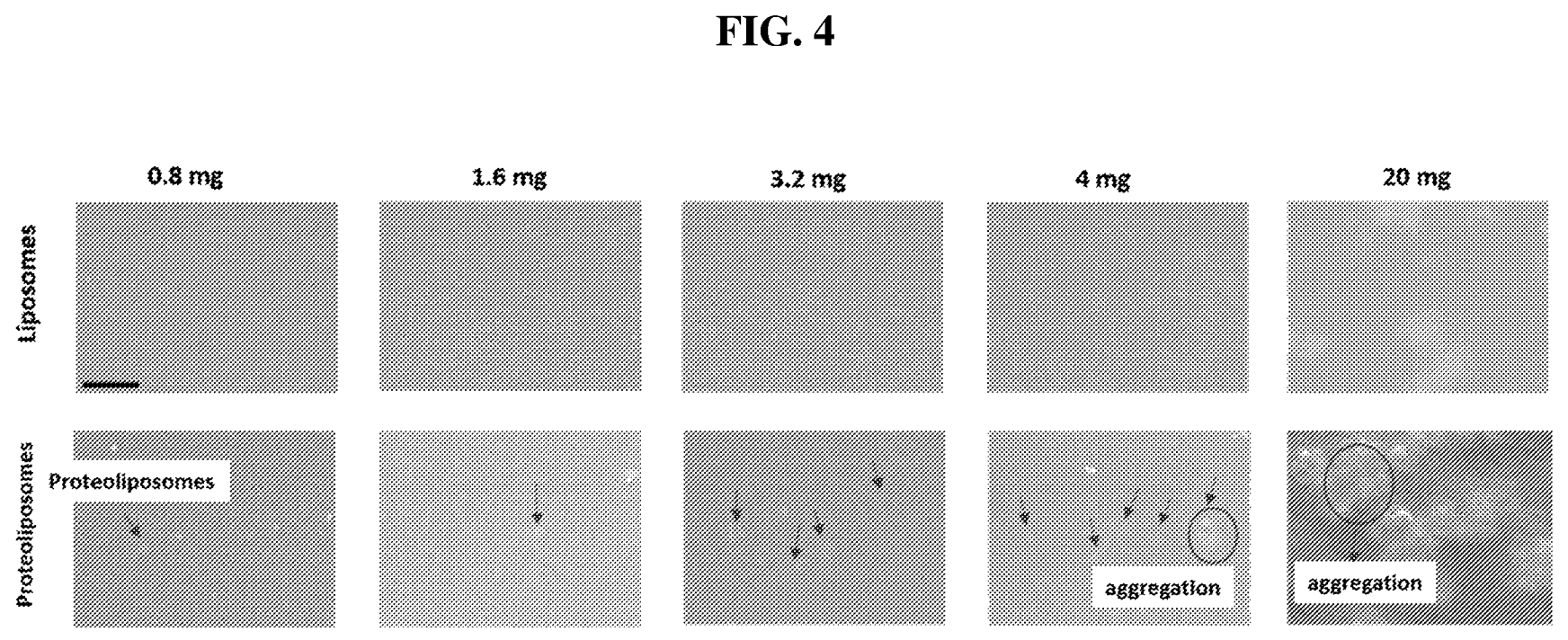

The FESEM images of the membrane substrate's surface having liposomes or proteoliposomes spray coated thereon are shown in FIG. 4. The top row of images showed the membrane substrate's surface sprayed with different amount of liposomes based on a liposome solution having a concentration of 10 mg/ml.

Generally, a smooth membrane substrate's surface with pores sized 10 nm were observed. When the liposomes' amount is increased, less pores on the substrate's surface were observed, especially for the substrate spray coated with 20 mg of liposomes, where aggregation of liposomes was observed.

Figure 3A:
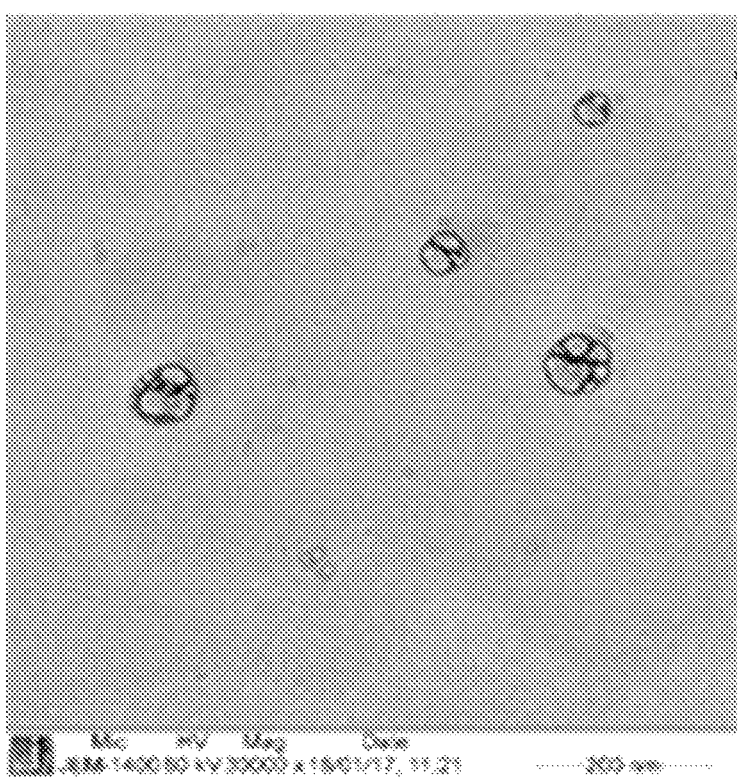
FIG. 3A shows a transmission electron microscopy (TEM) image of 1,2-dioleoyl-sn-glycero-3-phosphocholine (DOPC) liposomes. The scale bar denotes 200 nm.
Figure 3B:
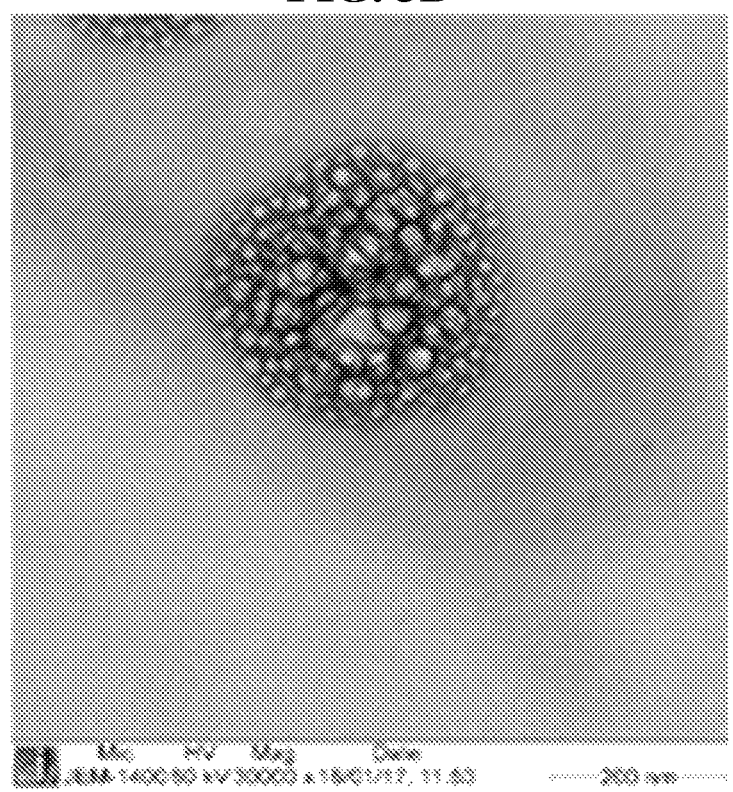
FIG. 3B shows a TEM image of proteoliposomes derived using DOPC liposomes. The protein to lipid ratio (molar ratio) is 1:400. The scale bar denotes 200 nm.

On the other hand, more severe aggregation was found for the substrate coated with proteoliposomes (the second row of images in FIG. 4), which was consistent with the observation in TEM (see FIGS. 3A and 3B). With smaller amount of proteolipsomes used for spray coating, discrete proteoliposomes sized about 100 nm were found on the substrate. When the coating amount exceeded 3.2 mg, the proteoliposomes started to aggregate. The most severe aggregation was observed for 20 mg of proteoliposomes spray coated. The more severe aggregation is likely caused by the negative extracellular charge of the protein water channel (e.g. aquaporin), as negatively charged vesicles were formed when aquaporin proteins were incorporated into the DOPC lipids.

The zeta potential of DOPC liposome is about −2 mV while that of the present proteoliposome is about −15 mV. The more negatively charged vesicles tend to minimize the surface area in contact with the hydrophobic polysulfone membrane substrate to render the lowest surface energy. Therefore, more aggregation and a rougher surface was observed for membrane substrate spray coated with proteoliposomes.

Figure 5:
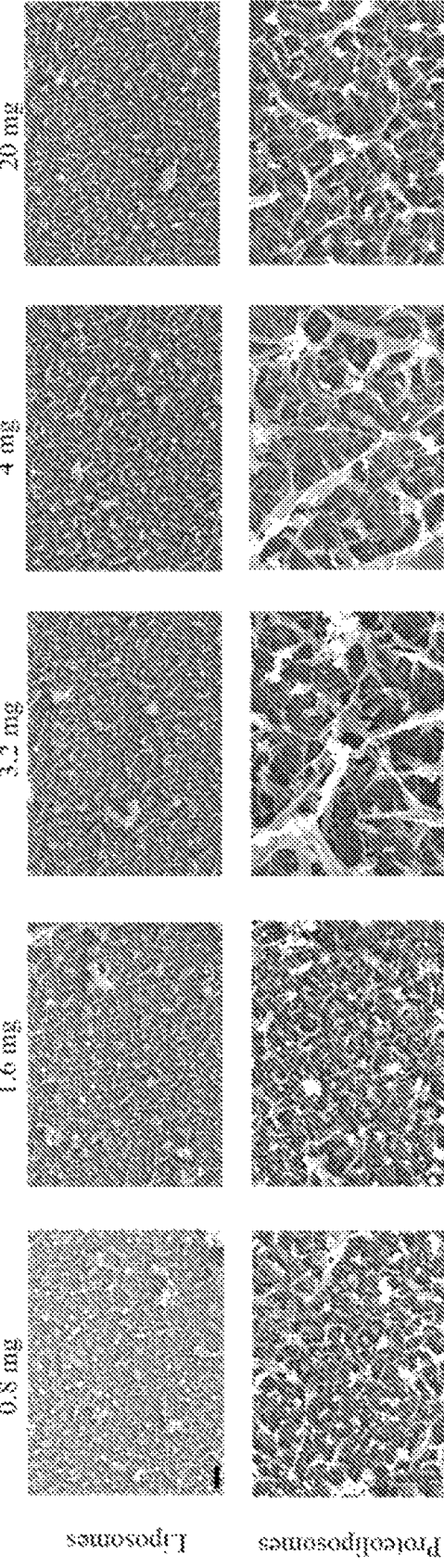
FIG. 5 shows FESEM images of membrane substrate incorporated with lipids (top row) and proteoliposomes (bottom row). The scale bar denotes 1 μm.

After interfacial polymerization reaction on the substrate, the polyamide layer was successfully formed (FIG. 5). The typical "valley-and-peak" structures appeared on the top surface, and the vesicles (i.e. liposomes and proteoliposomes) disappeared as the polyamide layer covered the vesicles. In the top row image of FIG. 5, insignificant surface morphological variations may be observed for the membranes incorporated with different amount of liposomes. However, larger leaf-like structures and more open structures were found at the membrane top surface with 3.2 mg of proteoliposomes used (see bottom row images of FIG. 5). Such larger leaf-like structures and more open structures may be due to additional MPD reacting with TMC in the secondary regime of the interfacial polymerization (i.e. a slowed down and diffusion limited growth regime). The severe aggregation of proteoliposomes likely provided more defects in the dense polyamide selective layer near the interface formed between the aqueous monomer that was deposited and the polysulfone substrate during the initial regime of the interfacial polymerization (i.e. incipient film formation). Such defects induced the MPD from the aqueous monomer phase to diffuse into the organic monomer phase that is then deposited. Thereafter, the salt permeability of the resultant membrane becomes significantly higher.

Figure 6A:
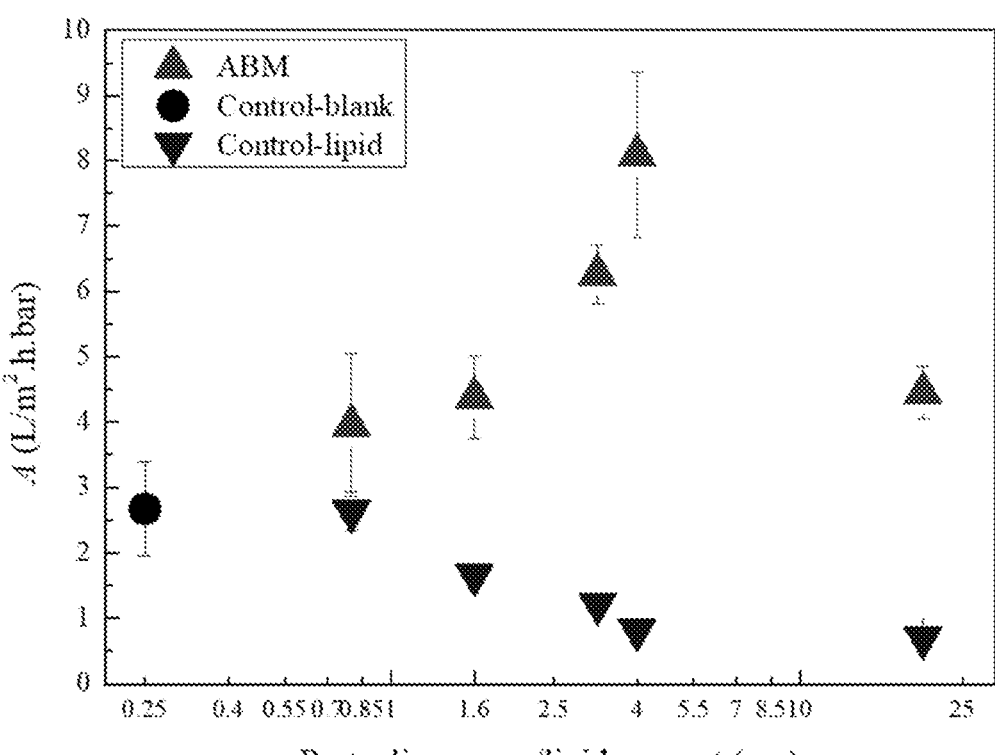
FIG. 6A shows the water permeability (A) of ABM and two types of control membrane samples. One control sample (control-blank) as represented by the circle is without lipids and proteoliposomes. The other is a control-lipid membrane, that is, without proteoliposomes, as represented by the inverted triangle. Testing conditions are based on 10 bar (1 MPa) applied pressure with 10 mM NaCl used as feed solution. The membrane samples are fabricated based on a method described in various embodiments of the first aspect of the present disclosure.
Figure 6B:
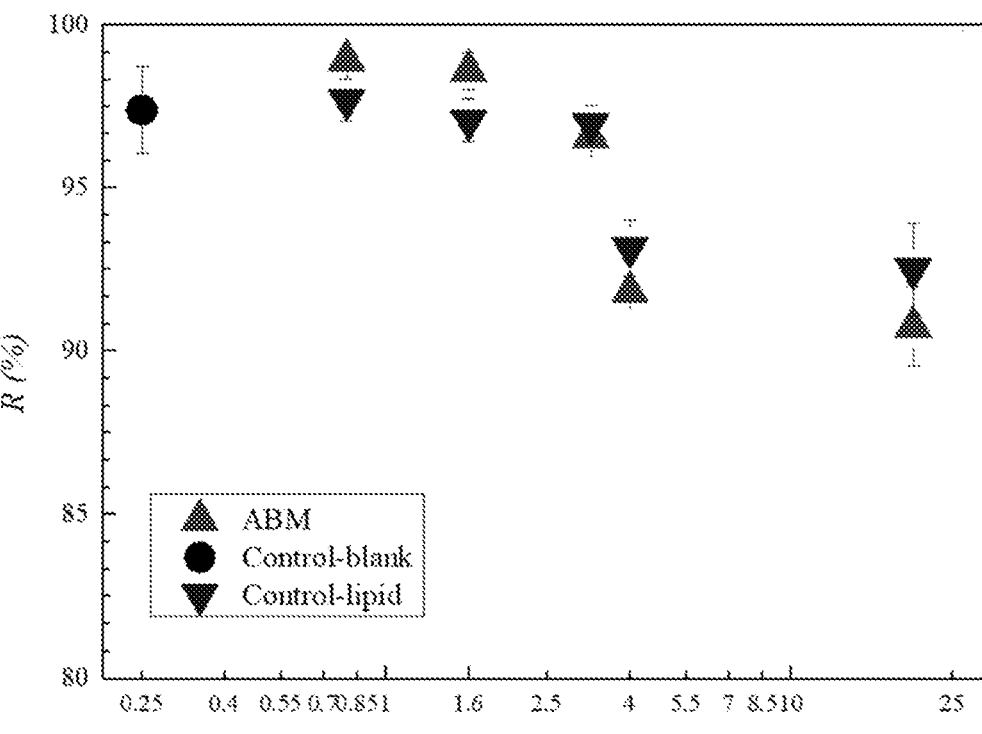
FIG. 6B shows the solute rejection (R) of the ABM and the two types of control membrane samples mentioned in FIG. 6A, subjected to the testing conditions as described for FIG. 6A. The term "solute rejection" may be used interchangeably with the term "salt rejection" in the present disclosure.
Figure 6C:
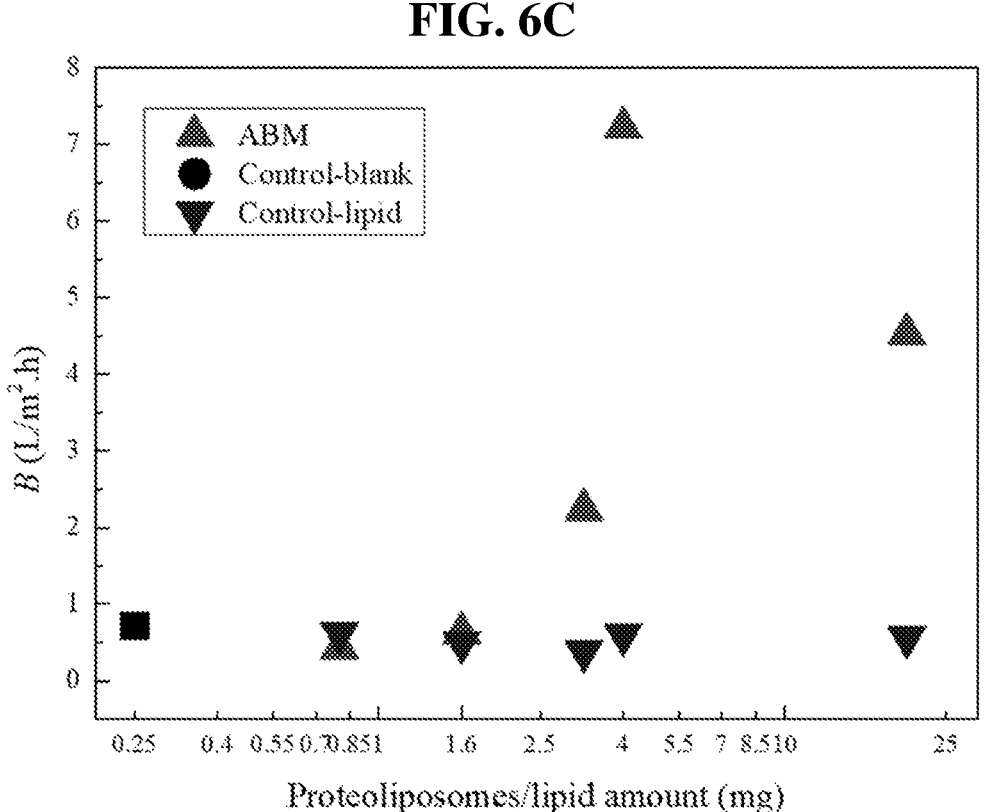
FIG. 6C shows the solute permeability (B) of the ABM and the two types of control membrane samples mentioned in FIG. 6A, subjected to the testing conditions as described for FIG. 6A.
Figure 8:
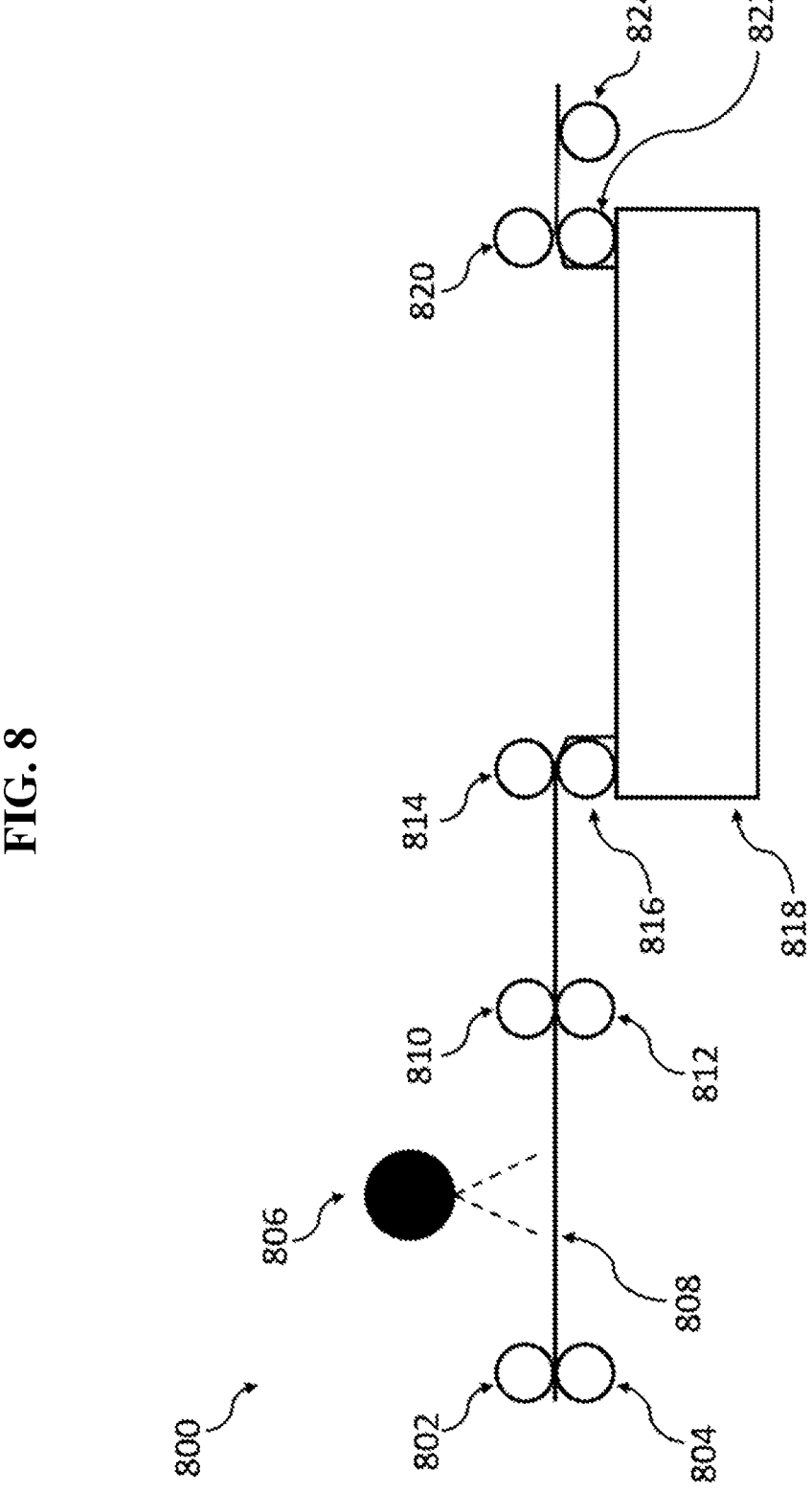
FIG. 8 is a schematic diagram showing a part (800) of the system of FIG. 1 and related to an aspect herein describing a system for fabricating a membrane comprising proteoliposomes having protein water channels. Specifically.

Example 8: Results and Discussion—Reverse Osmosis (RO) Performance of ABM Membranes The RO performance of the present ABM membranes was evaluated under 10 bar (1 MPa) of applied pressure using 10 mM NaCl as feed solution. The water permeability (A), solute (or salt) rejection (R), and the solute permeability (B) are shown in FIG. 6A to FIG. 6C, respectively. As shown in FIG. 6A, the control-blank membrane without liposome and proteoliposome has an A of 2.6 $L/m^2 \cdot h \cdot bar$. After incorporating the proteoliposomes, A increased with higher loading amount until the proteoliposomes amount used reached 4 mg. Afterwards, A sharply decreased when amount of proteoliposomes increased to 20 mg. As control samples, the same amount of lipids was incorporated into membranes and evaluated under the same conditions. At small amount of lipids (i.e. 0.8 mg), similar A was shown compared with the control-blank. As the amount of lipids increased, lower A was observed due to the impermeable property of lipid.

In FIG. 6B, solute rejection of all the membranes are illustrated. The control-blank membrane has an R of 97.5%. As the amount of lipids increased, the R of the control-lipid membranes was first maintained and then decreased sharply when the amount went above 3.2 mg. This is consistent with the FESEM images (FIG. 5), where larger amount of lipids on the surface of substrate led to more aggregations. Such aggregations led to more defects on the polyamide layer and caused lower R.

On the other hand, after incorporating proteoliposomes into the membranes, higher R was found at lower amount of proteoliposomes used (i.e. 0.8 and 1.6 mg). The AQP specifically allows water to pass through the channels and rejects the solutes at nearly 100%. The higher A also led to an increase of R according to the solution-diffusion mechanism of a RO membrane. These contribute to the higher R of the present ABM membranes for the lower amounts used. However, at more than 3.2 mg, the R of the present ABM membranes became lower than the corresponding control-lipid membranes, even when the A of the present ABM membranes were much higher than that of the control-lipid membranes (FIG. 6A). This is likely due to worse aggregation of proteolipsomes at higher amounts (FIG. 4), which resulted in more defects in the polyamide layer and led to a lower R.

Solute permeability (B) is one of the intrinsic properties of the resultant membrane, which specifically relates to the membrane's physical properties regardless of testing conditions. The B of all membranes are listed in FIG. 6C. Holistically, similar B values were found for control-lipid membranes regardless of the amount of lipids used. This may indicate good compatibility between the lipids and polyamide layer. Slightly lower B was found for the present ABM for lower amount of proteoliposomes used (i.e. 0.8 and 1.6 mg) due to the excellent water transport and salt rejection properties of AQP. However, further increasing the amount of proteoliposomes renders much higher B values. As shown in FIG. 5, proteoliposomes seem more prone to aggregation on the substrate's surface especially when the loading amount is larger. The severe aggregation not only causes defects but also alter the polyamide structure.

Example 9: Results and Discussion—Comparison with Other ABM Membranes

Based on equations (1) to (3) mentioned above, the intrinsic parameters of membranes (i.e. A, B, B/A) are summarized in FIG. 7. In addition, the testing conditions (i.e. applied pressure and membrane area), concentration of lipids, and proteoliposomes are also listed. Generally, after incorporating, for example, AqpZ into the membrane, higher water permeability A and higher salt rejection were found as compared to the corresponding control membranes. For ABM RO membranes, higher NaCl rejection is shown for both flat sheet and hollow fibre configurations. Conventionally, hollow fiber ABMs tend to possess substantially higher A value (about 8 LMH/bar) than flat sheet ABMs (about 4 LMH/bar) whereas salt rejection tends to be lower for hollow fiber ABMs due to lower applied pressure. According to FIG. 7, ABMs fabricated according to methods and system of the present disclosure achieved comparable, or even superior, A value compared to hollow fiber ABMs, with the capability to operate and achieve higher salt rejection even at high operating pressure.

AQP utilized during the membrane preparation has to be considered when evaluating scalability of a preparation technique for mass production of a membrane. The AQP consumption can be calculated based on the amount of lipid consumed and LPR (lipid to protein ratio). Given that the average molar weight of DOPC lipid is about 786 g/mol, *E. coli* lipid is about 744 g/mol, and AqpZ is about 24524 g/mol, respectively. The AqpZ consumption for different types of ABMs were therefore roughly calculated and listed in FIG. 7. As compared with conventional interfacial polymerizations, a significantly low amount of AqpZ is consumed in the present methods for fabricating the resultant membrane having comparable or even superior performance. For instance, only 5% of the AQP amount is required for the present methods to produce ABMs having similar performance to a membrane conventionally produced. It is clear that a highly efficient loading of proteoliposomes on the membrane substrate's surface was achieved through the present methods. Meanwhile, conventional interfacial polymerization that has been reported involves soaking of a membrane substrate into a solution containing the proteoliposomes, which adversely requires excess volume of the proteoliposomes and solution to even homogeneously cover the entire surface of the membrane substrate, resulting in a wasteful consumption of aquaporins. The low consumption of aquaporins via the present methods translates to huge cost savings, thereby substantiating the cost-effectiveness of the present methods and advantageous potential for large-scale membrane mass production.

Example 10: Comparison of Various Methods

The present methods include spraying the proteoliposomes on the membrane substrate before depositing the aqueous monomer and organic monomer for interfacial polymerization to form the selective layer thereon (the membrane formed from these steps was labeled ABM_2). The present methods can include depositing the aqueous monomer on the membrane substrate before spraying the proteoliposomes, then contacting the aqueous monomer with the organic monomer for interfacial polymerization (the membrane formed from these steps was labeled ABM_1). A third method where the proteoliposomes were mixed with the aqueous monomer, and then contacted with the organic monomer was tested (the membrane formed from these steps was labeled ABM_3). The steps and results of these three methods are summarized in Table 2A and 2B below, respectively.

TABLE 2A

| | Comparison of the Steps in the Three Methods | | |
|---|---|---|---|
| Membrane | Step 1 | Step 2 | Step 3 |
| ABM_1 | Soaking the membrane with aqueous monomer solution (MPD) | Spraying AQP proteoliposomes on top of the membrane | Contacting with organic monomers (TMC) |
| ABM_2 | Spraying proteoliposomes on top of the membrane | Soaking the membrane with aqueous monomer (MPD) | Contacting with organic monomers (TMC) |
| ABM_3 | Spraying the membrane with aqueous monomer solution (MPD) containing proteoliposome | Contacting with organic monomers (TMC) | |

Furthermore, since the incorporation of AQP into the membrane increases cost of RO membranes, the amount of Apart from the above, another method of mixing the proteoliposomes and organic monomer before contacting with the aqueous monomer was tested. However, the proteoliposomes cause precipitation of the organic monomer, compromising interfacial polymerization to form the selective layer. This demonstrated that the aqueous monomer solution can contain proteoliposomes but not the organic monomer solution.

From the results in Table 2B, it can be seen that changing the sequence of the procedures (i.e. soaking the aqueous monomer solution prior to spraying) did not produce a significant difference in terms of performance (ABM_1 and ABM_2). Spraying the aqueous monomer solution containing proteoliposomes yielded lower water permeability and solute rejection (ABM_3). The steps for ABM_3 may be suitable for fabricating aquaporin incorporated membranes for use in treatment processes that do not require high permeability and solute rejection

TABLE 2B

| Membrane Performance Comparison | | | |
| --- | --- | --- | --- |
| Membrane | Pure water permeability, A (L/m²•hr•bar) | Flux (L/m²•hr) | Solute Rejection, R (%) |
| ABM_1 | 1.26 ± 0.37 | 16.72 ± 4.63 | 99.04 ± 0.17 |
| ABM_2 | 1.21 ± 0.18 | 15.08 ± 2.00 | 98.13 ± 0.07 |
| ABM_3 | 0.51 ± 0.02 | 6.84 ± 0.30 | 93.78 ± 1.94 |

The results are based on an average value from three replicates. In other words, the results for ABM_1 were obtained after three trials. The results for ABM_2 were obtained after three trials. The results for ABM_3 were obtained after three trials.

The testing condition includes use of a NaCl solution having a NaCl concentration of 2,000 ppm, an applied pressure of 15.5 bar (1.55 MPa), a flow rate of 0.52 L/min, and a cross flow velocity of 0.1 m/s.

The concentration of AQP-DOPC proteoliposomes (based on a lipid to protein ratio of 400:1) was 10 mg/ml with 0.25 wt % OG present for ABM_1 and ABM_2. The concentration of AQP-DOPC proteolipsomes was 3.3 w/v % in MPD solution for ABM_3. For the aqueous monomer solution, 2.0 w/v % MPD was used and for the organic monomer solution, 0.15 w/v % TMC was dissolved in n-hexane. The aqueous monomer solution was contacted with the membrane substrate surface for 3 mins while the organic monomer solution was poured on the membrane surface for 30 s.

Example 11: Summary

In the present disclosure, aquaporin-based biomimetic membranes (ABMs) made by the present spray methods are developed. AqpZ-incorporated proteoliposomes were sprayed on the flat sheet membrane substrate surface, and then immobilized in a polyamide layer formed via interfacial polymerization (IP). The features of resultant membrane are summarized below.

Based on the stopped-flow and DLS measurement results, higher PLR increased water permeability of the resultant membrane. Increasing the loading of protein water channels (e.g. aquaporins) in liposome vesicles increases the PLR. This, however, led to aggregation of proteoliposomes and ultimately yielded the measured water permeability for a PLR of as high as 1:100.

The amount of proteoliposomes sprayed on the substrate surface greatly affects the morphology and performance of the resultant ABM membranes. High loading amount led to severe aggregation of proteoliposomes on top of the substrate surface, which greatly increased the membrane surface roughness, thereby affecting the membrane solute rejection due to defects formation.

The ABMs fabricated in the present methods achieved higher water permeability than ABMs produced from conventional methods. The ABMs of the present has comparable or even superior water permeability compared to hollow fiber ABMs, having the capability to operate at higher pressure and producing higher salt rejection.

A highly efficient loading of proteoliposome onto the membrane substrate surface was achieved through the present spray technique. Only 5% of the AQP amount was required for the spray method to produce ABMs with performance similar to reported ABMs. Such low AQP consumption translates to huge cost saving that may arise from just the production of the protein water channels (aquaporins), substantiating the potential and cost-effectiveness of the present methods for scaling up.

Examples of the present methods to fabricate a thin film composite layer on a flat sheet membrane may include the steps of spraying a proteoliposome solution on a flat sheet membrane substrate, drying the proteoliposome-coated flat sheet membrane substrate using inert gas, soaking the proteoliposome-coated flat sheet membrane in a first monomer (aqueous) solution of m-phenylenediamine (MPD), drying the MPD-proteoliposome-coated flat sheet membrane using inert gas, and reacting the MPD-proteoliposome-coated flat sheet membrane with a second monomer (organic) solution of trimesoyl chloride (TMC) to form the thin film composite layer thereon.

The proteoliposome solution can contain liposome vesicles having water channels. For instance, the membrane of a liposome can be constructed of lipids and aquaporins (AQP), wherein AQP forms the protein water channel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of fabricating a membrane comprising proteoliposomes having protein water channels, the method comprising:

providing a porous substrate;

spraying a solution comprising the proteoliposomes on the porous substrate to cover a surface of the porous substrate with the proteoliposomes;

drying the porous substrate having the solution deposited thereon to form a porous substrate having a layer of proteoliposomes deposited directly thereon;

contacting the porous substrate having the layer of proteoliposomes deposited directly thereon with an aqueous monomer solution followed by an organic monomer solution; and carrying out interfacial polymerization on the aqueous monomer solution and the organic monomer solution to form a selective layer covering the layer of proteoliposomes on the porous substrate.

2. The method of claim 1, wherein spraying the solution comprises moving the porous substrate unidirectionally under a discharge module which sprays the solution on the porous substrate.

3. The method of claim 1, wherein the solution further comprises a (i) surfactant and/or (ii) a salt, wherein the surfactant comprises n-octyl-P-D-glucoside, n-octanoylsucrose, n-nonanoylsucrose, n-decanoylsucrose, n-undecyl-P-D-glucopyranoside, n-undecyl-P-D-thioglucoside, n-undecyl-β-O-thiomaltoside, n-undecyl-P-D-thiomaltopyranoside, n-undecyl-β-O-thioglucopyranoside, or a combination thereof, wherein the salt comprises sodium chloride, magnesium chloride, monosodium phosphate, or a combination thereof.

4. The method of claim 3, wherein the surfactant is present in the solution at a concentration ranging from 0.0002 wt % to 2 wt %.

5. The method of claim 3, wherein the salt is present in the solution at a concentration ranging from 0.001 M to 0.5 M.

6. The method of claim 1, wherein contacting the porous substrate with the aqueous monomer solution followed by the organic monomer solution comprises soaking the porous substrate in the aqueous monomer solution prior to soaking the porous substrate in the organic monomer solution.

7. The method of claim 1, wherein the porous substrate is formed of a polymer comprising polyetherimide, cellulose ester, polyacrylonitrile, polysulfone, polyethersulfone, polyvinylidene fluoride, cellulose acetate, or a derivative thereof.

8. The method of claim 1, wherein the porous substrate is formed of an inorganic material comprising carbon, titanium, aluminum oxide, or ceramic.

9. The method of claim 1, wherein the solution comprises the proteoliposomes in a concentration ranging from 1 mg/ml to 100 mg/ml.

10. The method of claim 1, wherein contacting the porous substrate with the aqueous monomer solution followed by the organic monomer solution comprises
   (i) dissolving a polyfunctional amine in an aqueous solution to form the aqueous monomer solution; and
   (ii) dissolving a polyfunctional acyl chloride or a polyfunctional sulfonyl chloride in an organic solvent to form the organic monomer solution.

11. The method of claim 10, wherein the polyfunctional amine comprises o-phenylenediamine, m-phenylenediamine, or piperazine.

12. The method of claim 10, wherein the polyfunctional acyl chloride comprises trimesoyl chloride, isophthaloyl chloride (IPC), 5-isocyanato-isophthaloyl chloride (ICIC), or 5-chloroformyloxy-isophthaloyl chloride (CFIC).

13. The method of claim 10, wherein the polyfunctional sulfonyl chloride comprises 1,5-naphthalene-bisulfonyl chloride, 1,3-dimethyl 2-imidazolidinone, or 1,3-dioxo-1,3-dihydroisobenzofuran-5-sulfonyl chloride.

* * * * *